US008764567B2

(12) United States Patent
Smith et al.

(10) Patent No.: US 8,764,567 B2
(45) Date of Patent: Jul. 1, 2014

(54) SYSTEM AND METHOD FOR IMPLEMENTING TURN-BASED ONLINE GAMES

(75) Inventors: Philip Anthony Smith, Davis, CA (US); Gabriel Belinsky, Cupertino, CA (US); Erik D. Strahm, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 13/224,519

(22) Filed: Sep. 2, 2011

(65) Prior Publication Data

US 2012/0309539 A1 Dec. 6, 2012

Related U.S. Application Data

(60) Provisional application No. 61/492,939, filed on Jun. 3, 2011.

(51) Int. Cl.
G07F 17/32 (2006.01)

(52) U.S. Cl.
USPC .............................................. 463/42; 463/20

(58) Field of Classification Search
USPC ....................................... 463/20, 42
See application file for complete search history.

(56) References Cited

U.S. PATENT DOCUMENTS

| 7,311,608 | B1 * | 12/2007 | Danieli et al. | 463/42 |
| 2005/0170883 | A1 * | 8/2005 | Muskin | 463/25 |
| 2007/0173325 | A1 * | 7/2007 | Shaw et al. | 463/42 |
| 2008/0242420 | A1 | 10/2008 | Graepel et al. | |
| 2012/0136465 | A1 * | 5/2012 | Guinn et al. | 700/92 |
| 2012/0311036 | A1 * | 12/2012 | Huhn | 709/204 |
| 2013/0252718 | A1 * | 9/2013 | Arnone et al. | 463/25 |
| 2013/0281192 | A1 * | 10/2013 | Arnone et al. | 463/25 |

OTHER PUBLICATIONS

International Search Report and Written Opinion from foreign counterpart PCT Application Serial No. PCT/US2012/039693, mailed Sep. 7, 2012, 9 pages.
"GameKnot: getting started on GameKnot", Nov. 25, 2010. Retrieved from the Internet: URL:http:web.archive.org/web/20101125070223/http:/gamknot.com/pg/get_started.htm [retrieved on Aug. 29, 2012].
Screenshots from gameknot.com Aug. 28, 2012, XP55036687, Retrieved from the Internet: URL:gameknot.com [retrieved on Aug. 29, 2012].
International Preliminary Report on Patentability (Chapter I) for corresponding International Application No. PCT/US2012/039693, mailing date Dec. 19, 2013, 7 pages.

* cited by examiner

*Primary Examiner* — Pierre E Elisca
(74) *Attorney, Agent, or Firm* — Blakely, Sokoloff, Taylor & Zafman LLP

(57) ABSTRACT

A system and method are described for initiating a turn-based game before the entire set of users to participate in the turn-based game have been identified. For example, a first user may initiate a turn-based game having a plurality of slots. In response, the first user is assigned to a first slot in the plurality of slots and the first user is allowed to take a turn in the turn-based game in the first slot before all of the other plurality of slots have been assigned to other users. One or more additional users are then matched to the first user based on a specified set of matching criteria and the new users are assigned to one or more additional slots in the plurality of slots. The additional users then take turns in the turn-based game according to their slots.

18 Claims, 18 Drawing Sheets

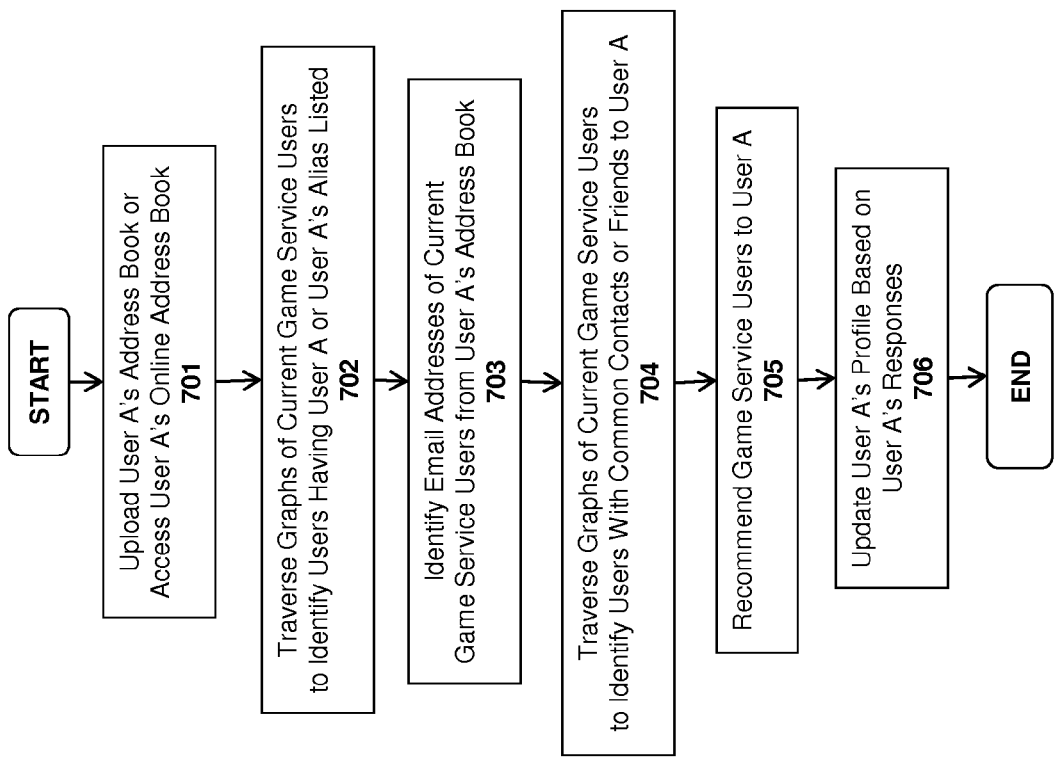

SYSTEM AND METHOD FOR IMPLEMENTING TURN-BASED ONLINE GAMES

CLAIM TO PRIORITY

This application claims the benefit of the filing date under 35 U.S.C. §119(e), of U.S. Provisional Application No. 61/492,939, filed on Jun. 3, 2011.

BACKGROUND

1. Field of the Invention

This invention relates generally to the field of network computing. More particularly, the invention relates to an improved apparatus and method for generating friend recommendations for applications such as (but not limited to) video games.

2. Description of Related Art

Current online services allow two or more friends to participate in online video games. To establish an online session with a friend, a user is typically required to log in to the service providing the online session and manually identify friends with their online names or email addresses. Given that a user may already have an address book containing the names, email addresses and other identifiers for the user's friends, using this information to help the user connect with friends on the service would greatly simplify the process of identifying friends for online video games and other types of online sessions.

Accordingly, what is needed is a more efficient way to manage and identify friend recommendations for new users of online services.

BRIEF DESCRIPTION OF THE DRAWINGS

A better understanding of the present invention can be obtained from the following detailed description in conjunction with the following drawings, in which:

FIG. 7 illustrates one embodiment of a method for making friend recommendations to a user.

DETAILED DESCRIPTION OF PREFERRED EMBODIMENTS

Described below are embodiments of an apparatus, method, and machine-readable medium for managing friend data within a partitioned database architecture, generating friend recommendations for online sessions such as (but not limited to) video game sessions, and generating video game recommendations.

The assignee of the present application has previously filed patent applications related to an online friend service, some embodiments of which are described in Apparatus and Method for Efficiently Managing Data in a Social Networking Service, Ser. No. 12/831,888, Filed Jul. 7, 2010 (hereinafter "Friend Service Application"), and an online matchmaking and gaming service, some embodiments of which are described in Apparatus and Method for Matching Users for Online Sessions, Ser. No. 12/832,015, Filed Jul. 7, 2010 (hereinafter "Matchmaker Application"). Certain, pertinent aspects of these services will initially be described, followed by a detailed description of embodiments of the present invention.

Embodiments of a Friend Service

Figure 1:
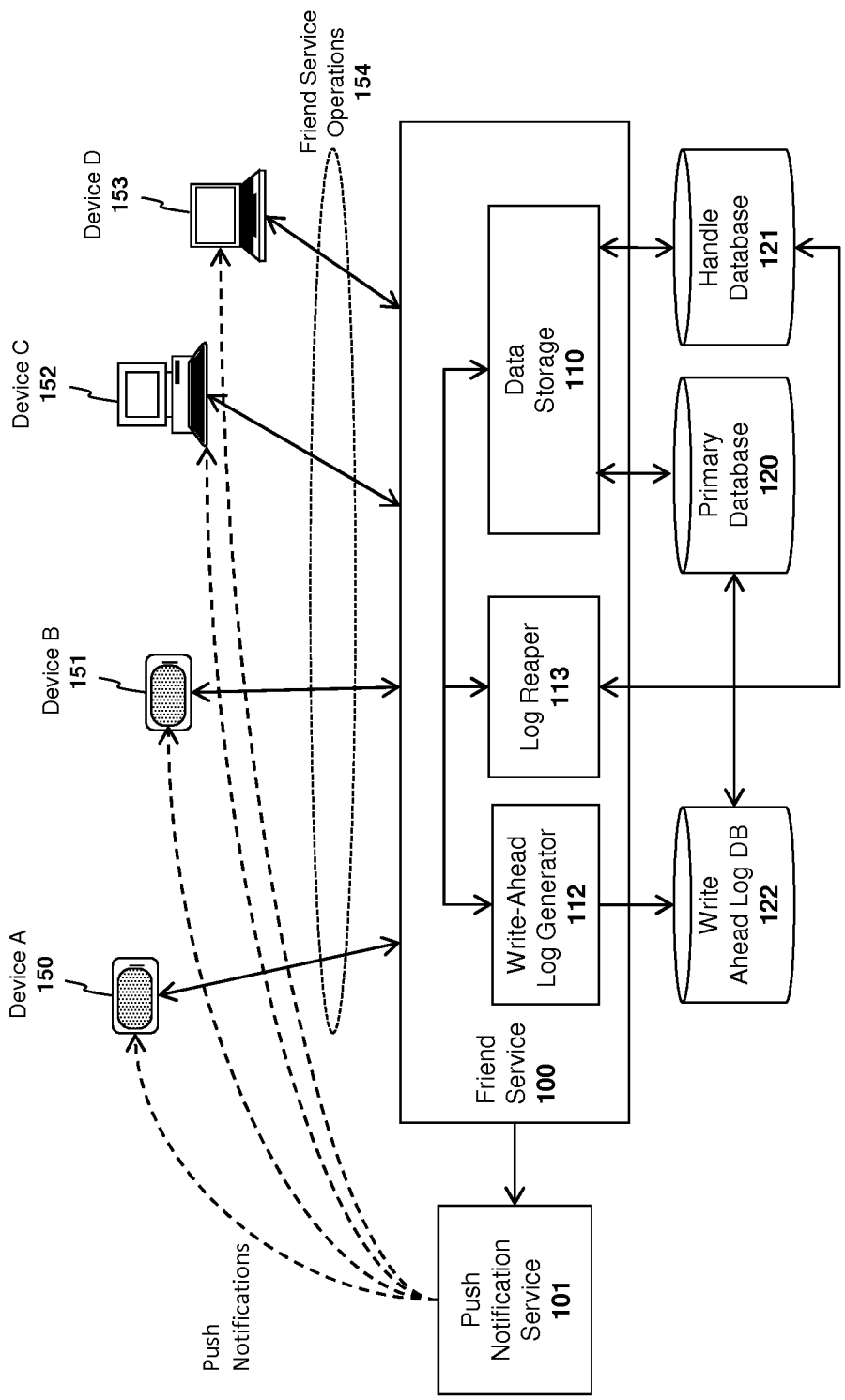
FIG. 1 illustrates a friend service according to one embodiment of the invention.

FIG. 1 illustrates one embodiment of a system architecture for implementing a friend service 100. This embodiment can include a data storage module 110 to store friend data within a primary data storage device 120 and a "handle" database 121. In one embodiment, the primary database 120 and handle database 121 may be key/value pair databases, examples of which include Berkley DB and MZBasic DB. These databases may be spread across a large number mass storage devices (e.g., hard drives) in a Storage Area Network (SAN) or other storage configuration. In one embodiment, the primary database 120 and the handle database 121 stores the underlying database data and the data storage module 110 implements various operations described herein to efficiently manage the data within the databases 120-121.

As mentioned above, the data storage module 110 manages "handle" data within the handle database 121. As described below, a "handle" is a unique string or ID code for identifying users who do not have an account on the friend service 100 (or who have an account but whose account has not been associated with the unique sting or ID code have not yet been identified). For example, in one embodiment, the handle takes the form of the user's email address or a hash of the user's email address (sometimes referred to below as a "token").

The friend service 100 can also include a log generator 112 for logging database updates within a write-ahead log database 122 and a log reaper module 113 for using the entries in the write-ahead log database 122 to detect and repair data conflicts within the primary database 120 and/or the handle database 121. The write ahead log database 122 may also be implemented as a key/vale pair database, although such a configuration is not required.

Moreover, although illustrated as a system with three separate databases 120-122 in FIG. 1, a single database can be used for storing the friend data, handle data and write-ahead data while still complying with the underlying principles of the invention.

As shown in FIG. 1, various different types of computing devices 150-153 may connect to the friend service 100 over various different types of networks (e.g., the Internet). The devices may include wireless devices 150-151 such as the Apple iPod Touch®, Apple iPhone®, Apple iPad®, RIM Blackberry® devices, Palm Pre® devices, etc, or any other type of computing devices including standard desktop computers 152 and laptops 153. In some embodiments, the devices include application programming interfaces (APIs) designed to communicate over the network by executing a series of operations or commands 154 (described below). Applications installed on the computing devices 150-153 may then utilize the API to execute the various operations 154 described herein.

In one embodiment of the invention, each user is identified within the friend service 100 by either a unique destination signaling identifier ("DSID") or a unique handle. In one embodiment, a DSID is used to identify users who are known to have accounts on the friend service 100. These users are sometimes referred to below as "in-network users." A handle can be used to identify users who are not known to have accounts on the friend service 100. These users are sometimes referred to below as "out-of-network users." As described below, this may include users who have not yet registered an account on the friend service and/or users who have an account on the friend service but who have not yet associated a particular handle with their account. A DSID can take on various different forms including a 64 bit ID code and a handle can be an email address or other known identifier of an out-of-network user (or a hash of the identifier, referred to as a "token"). It should be noted, however, that the underlying principles of the invention are not limited to any particular types of user ID codes for identifying users.

As illustrated in FIG. 1, in one embodiment, a push notification service 101 is used to push certain notifications such as incoming friend requests to the mobile devices 150-153. An exemplary push notification service 101 is described in the Co-Pending applications which have been incorporated herein by reference. Additional details of one embodiment of a push notification service can be found, for example, in the co-pending application entitled Automatic Notification System and Process, Ser. No. 12/042,307, Filed Mar. 4, 2008 (hereinafter "Push Notification Application"), which is assigned to the assignee of the present application and which is incorporated herein by reference.

Although push notifications are shown in FIG. 1, various other forms of notifications may be used. For example, notifications may be sent using email, short message service (SMS), and/or various other electronic messaging formats. As described below, in one embodiment, "in-network" users (i.e., those users with an account on the friend service) are notified through push notifications whereas "out-of-network" users (i.e., those users without an account or not identified on the friend service) are notified through email, SMS or other electronic messaging format.

Figure 2:
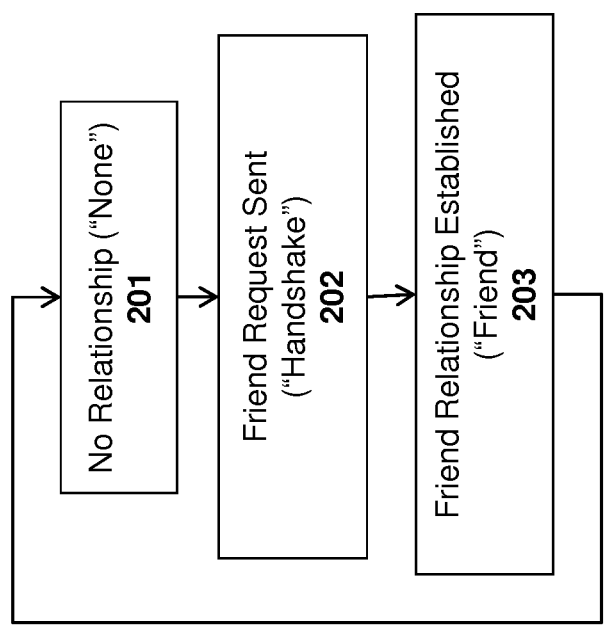
FIG. 2 illustrates a method for establishing friend relationships according to one embodiment of the invention.

As illustrated in FIG. 2, in one embodiment, a relationship between two users on the friend service may cycle between three different states:

At 201, there is no relationship between the two users. This is referred to as the "none" state and, in one embodiment, it is the default state. In this state, users have not sent friend requests to one another and neither of the users are registered as "friends" within the primary friends database 120. A relationship leaves this state when one of the users makes a friend request to the other.

At 202, when a first user initiates a friend request to a second user, the second user's relationship state associated with the first user moves the "handshake" state. In one embodiment, the relationship remains in this state until the second user's acceptance of the friend request. As described below, in one embodiment, to reduce system load and data consistency issues associated with the friend request, only the second user's record (i.e., the recipient's record) is updated within the primary database 120 or the handle database 121.

At 203, the second user has accepted the first user's friend request. As a result, the relationship states of both the first user and the second user can enter the "friend" state within the primary database 120 and/or the handle database 121. A relationship may remain in the friend state until one of the users de-friends the other user. When this occurs, the relationship can revert back to the "none" state at 201.

A user identified by a DSID (e.g., an "in network" user) can send a friend request to another DSID or to a handle (e.g., an "out-of-network" user). Requests sent to another DSID are delivered in-network (i.e., within the friend service 100). Requests sent to a handle may be delivered out-of-network using, for example, an email message or an instant message. In one embodiment, the delivery may include a handle/token used to identify the recipient within the handle database, an identification code to identify the user sending the friend request and/or a URL that can be used to accept the request. In one embodiment, if the friend request was sent to the recipient using the recipient's email address, the token may be an MD5, SHA-1 or other hash of the recipient's email address. The recipient may select the URL with a mouse or cursor control device to respond to the friend request. Selecting the URL may take the user to a Web page containing data fields for logging in to the friend service 100 and/or for establishing a new account on the friend service 100. As described below, if the user already has an account on the friend service, once logged in, the friend request data from the recipient's Friend State Record may be transferred from the handle database 121 to the primary database 120.

As mentioned above, in one embodiment, all data may be stored in the underlying databases 120-122 as key/value pairs. The friend service 100 can hide this detail behind the API used on each of the devices 150-152 which may interact with the data using a predefined set of operations for managing friend data. Reads from the databases 120-122 may be accomplished by passing a key (e.g., a DSID, handle or token) and retrieving its associated value. Updates can be done by reading the old value, modifying, and replacing it, using an optimistic locking capability of the underlying persistence layer (described below).

B. Data Storage Representations

Figure 3:
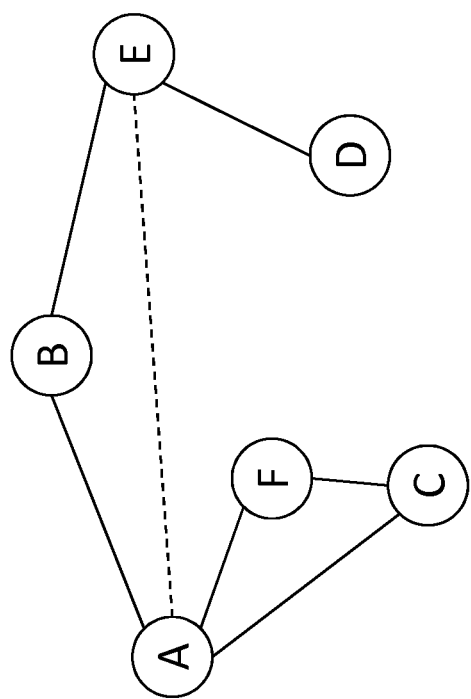
FIG. 3 illustrates an exemplary graph of relationships between a plurality of nodes.

FIG. 3 illustrates an example of friend relationships between a group of users A-F in which the relationships are represented by lines (sometimes referred to as the "edges" of the friend graph. In this example, user E has sent a friend request to user A and user A is friends with B, C, and F. These relationships may be represented within a database using different techniques. One technique, for example, can generate a record for each relationship. For example, the following records can be stored for node A to represent its relationship with each of the other nodes:

Record A-B: Friends
Record A-C: Friends
Record A-E: Friend Request Sent by E
Record A-F: Friends In this example, A-B, A-C, A-E, and A-F can be keys generated by the concatenating the DSID of A with the DSIDs of B, C, E, and F, respectively. In one embodiment, the DSIDs may be concatenated with the larger DSID following the small (although in this example, the DSID of A is assumed to be larger than the DSIDs for the other users).

Embodiments of an Online Game Matchmaker Service

Figure 4:
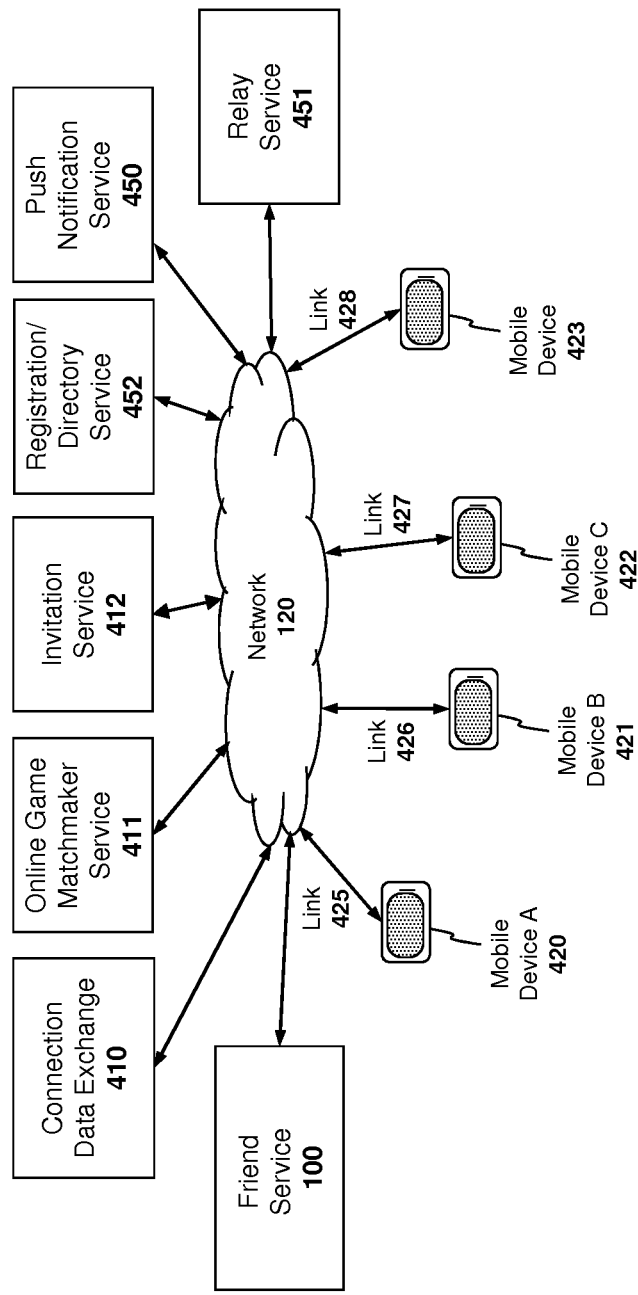
FIG. 4 illustrates a plurality of different network services employed in one embodiment of the invention.

As illustrated in FIG. 4, in addition to the friend service 100, one embodiment of the invention includes a connection data exchange (CDX) service 410 for establishing peer-to-peer sessions between users, a video game matchmaking service 411 for pairing users with other users for online games, an invitation service 412 for inviting users to online sessions, a registration/directory service 452 for storing user IDs, a push notification service 450 for pushing notifications to mobile devices, and a relay service 451 for establishing relay connections between devices when P2P connections are not possible.

As mentioned above, in one embodiment, the invitation service 412 and/or the matchmaker service 411 can use the registration/directory service 452 to identify registered mobile devices and the push notification service 450 to push data to the mobile devices. In one embodiment, when a mobile device is activated on the network, it registers a push token with a database maintained by the registration/directory service 452 by associating the push token with a password protected user ID or a telephone number. If the push token is identified in the registration directory (e.g., by performing a query with the user ID), the push notification service 450 can use the push token to transmit push notifications to a mobile device. In one embodiment, the push notification service is the Apple Push Notification Service ("APNS") designed by the assignee of the present application.

Figure 5:
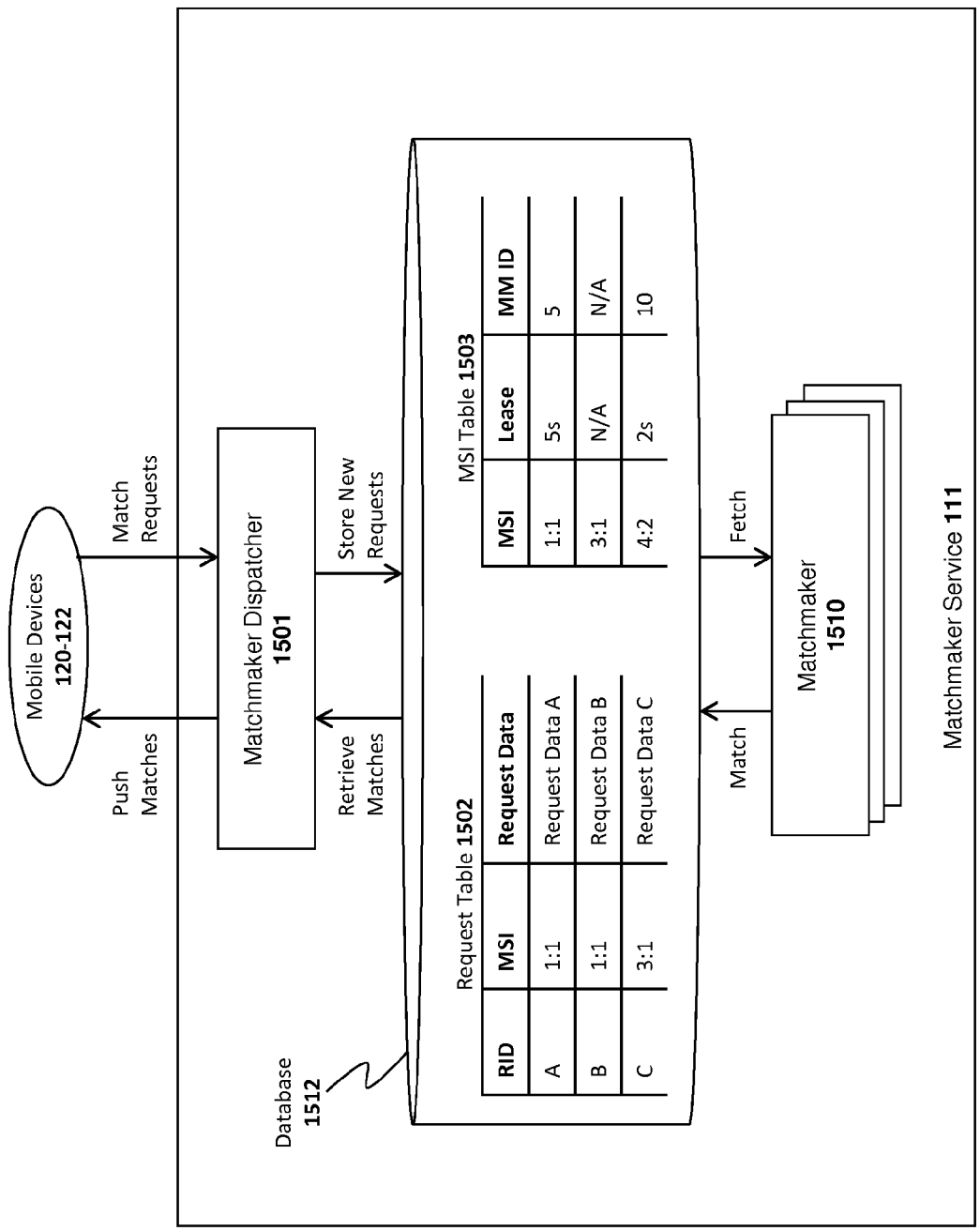
FIG. 5 illustrates a matchmaker service employed in one embodiment of the invention.

As illustrated in FIG. 5, one embodiment of a matchmaker service 111 can include a matchmaker dispatcher 501 for receiving match requests and pushing match responses to mobile devices 120-122; a database 512 for storing match requests in a request table 502 and for storing matchable set data in a matchable set identifier ("MSI") table 503; and one or more matchmakers 510 for fetching match requests from the database 512, performing matching operations, and storing the match results back in the database 512. It should be noted, however, that the underlying principles of the invention are not limited to the specific architecture shown in FIG. 5.

In one embodiment, the matchmaker dispatcher 501 acts as an interface to the matchmaker service 111, receiving requests from mobile devices 120-122, translating those requests into commands to store the requests in the database 512, reading match results from the database 512, and translating and communicating those results to the mobile devices 120-122.

In operation, when a new match request arrives, the matchmaker dispatcher 501 can store the request within a row of the request table 502. In one embodiment, the dispatcher 501 assigns each match request a request ID ("RID") code, illustrated simply as "A," "B" and "C" in FIG. 5 (corresponding to mobile devices A, B and C, respectively). While shown using a letter designation in FIG. 5 for simplicity, the RID code may be a string, integer, or any other variable type suitable for tracking match requests within the database.

Each match request may be assigned a matchable set identifier ("MSI") value which is stored in the request table 502. In one embodiment, the MSI can identify the specific application for which a match is being requested and/or the configuration parameters to be used for that application. For example, an MSI value of 12:4 may identify a particular multi-player game with the identifier "12" and may identify a particular configuration for the game with the identifier "4." More specifically, the ID code of 12 may identify a particular multi-player racing game and the ID code of 4 may specify a particular racing track, speed, or player experience level for the racing game. In one embodiment, application developers are provided the option to specify any application configuration parameters using MSI values in this manner. In one embodiment, rather than specifying an MSI directly, application developers specify a game ID (to identify a particular game) and a bucket ID (to identify a particular game configuration) and these values are mapped to an MSI value by the matchmaker dispatcher 501.

Additionally, several different MSI values may be used within a single MSI to specify multiple different configuration parameters (e.g., 12:4:1 might represent: 12=racing game; 4=track; and 1=experience level). As described in detail below, in one embodiment, each MSI is used by a matchmaker 510 to identify a set of match requests in which matchmaking operations can be performed (e.g., requests are grouped based on MSI and matches are performed within each MSI group). In one embodiment, each MSI may be dynamically modified/selected by the dispatcher to include a partition ID identifying different machine partitions. For example, if a particular MSI becomes overloaded, the dispatcher may split the MSI between two or more different servers and/or storage partitions (e.g., using designations such as 4:3:1 and 4:3:2 where the last digits identify partitions 1 and 2, respectively). A different matchmaker may then independently retrieve and process requests from each of the different MSIs from each of the different servers.

As illustrated in FIG. 5, match request data may also be stored within the request table 502 for each request. The request data may include any data usable for rendering a matchmaking decision and/or any data needed to access the mobile device initiating the request over the network. For example, in one embodiment the match request data for each request includes the NAT type data and/or NAT traversal/connection data for the mobile device initiating the request. Other types of request data may also be stored within the request table 502 such as device connection speed (100 kbps, 1 Mbps, etc), connection type (e.g., 3G, EDGE, WiFi, etc), device location (e.g., determined by geo-location techniques), language (English, Spanish, etc), and/or user preferences. The request data may be determined by each mobile device 120-122 and transmitted to the matchmaking dispatcher 501 with each match request. For example, each mobile device may determine its connection data, connection type, device location, etc, using various techniques, some of which are described herein (e.g., communicating with a NAT traversal server to determine NAT traversal/connection data, using GPS to determine device location, reading HTTP information to determine language, etc).

As illustrated in FIG. 5, in one embodiment, each active MSI can be assigned a row in the MSI table 503. In one embodiment, when a new request arrives, in addition to adding the request to the request table 502, the dispatcher 501 also checks the MSI table 503 to determine whether an MSI already exists for that request (i.e., whether other requests having the same MSI have already been received). If no matching MSI is found, then the dispatcher 501 may create a new entry in the MSI table 503 for the new request. If a matching MSI is found, then the dispatcher can simply add the new request to the request table 502 as described above.

Once the request table 502 and MSI table 503 are updated by the matchmaker dispatcher 501, an instance of a matchmaker module 510 (hereinafter simply referred to as "matchmaker 510") fetches the data to perform matchmaking operations. Multiple matchmaker instances may be concurrently executed to perform matchmaking requests and a single matchmaker 510 may concurrently process multiple matchmaking operations on multiple different MSI groups.

In one embodiment, when a matchmaker 510 becomes available (e.g., after completing matching operations for an MSI group or after being initialized), it queries the MSI table 503 to identify a new MSI to process. In FIG. 5, the "N/A" value in the matchmaker ID fields for MSI 3:1 indicate that the responsibility for processing this MSI has not yet been assigned to a matchmaker. In one embodiment, each MSI entry is time-stamped and the matchmaker 510 selects an MSI having the oldest time-stamp.

In one embodiment, when a matchmaker 510 assumes responsibility for a particular MSI, it updates its matchmaker ID code in the MSI table 503 and specifies a lease duration for that MSI (e.g., 5 seconds). In one embodiment, the matchmaker 510 continually updates the lease value as it processes matches for that MSI. The lease values may be used to identify MSIs which were assigned to failed matchmakers 510. For example, if the lease value has expired, that MSI may be claimed by a new matchmaker notwithstanding the fact that the MSI table 503 indicates that the MSI is already assigned to a matchmaker.

Once the matchmaker 510 has assumed responsibility for an MSI, it can query the request table 502 to read requests associated with that MSI into memory. The matchmaker 510 can then perform matching operations to match users and mobile devices according to a set of matching criteria (e.g., as described below). The matchmaker 510 can update the request table 512 to indicate when matches of mobile device have been made. For example, the matchmaker can remove the MSI values from the MSI column in the request table 512 and enter a predefined value to indicate that the match has been completed. In addition, the matchmaker 510 may update the "request data" field for each participant to identify the other participants with which that participant was matched (e.g., by writing the NAT traversal/connection data needed to communicate with the other participants).

The dispatcher 501 can periodically query the request table 502 to identify completed matches. In response to detecting a completed match, the dispatcher 501 may transmit a push notification to the mobile devices involved in the match (e.g., using the push notification techniques described herein and in the co-pending applications). In one embodiment, the push notification includes the "ticket" data structure described above. The mobile devices may then use each of their tickets to exchange connection data via the CDX service 110 as described above.

In addition to using push notifications, in one embodiment, the mobile devices 120-122 may periodically query the dispatcher 501 to determine if a match has been made. Periodic queries are useful in case the push notification has not made it to the mobile device. However, because a push architecture is used, the periodic queries may be set to a relatively low rate, thereby reducing the load on the matchmaker service 111.

System and Method for Generating Friend Recommendations

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Embodiments of the invention are described below within the context of a new user joining a game center service which allows the user to participate with other users (e.g., "friends") in multi-player games. It should be noted, however, that the underlying principles of the invention may be implemented within the context of various other types of multi-user services including, but not limited to, video chat services and instant messaging services.

In one embodiment, the game center service is a social gaming network and each registered user has a unique player ID and a corresponding profile which contains associated email addresses and a list of in-network friends. A player can have multiple email addresses and these email addresses are considered in-network if a user has vetted them by going through a process to prove ownership. In one embodiment, friendships in the game center service are created by a player first sending a friend request to another player and the recipient player accepting the friend request. The system guarantees bi-directional friendships i.e. if Player A and B are friends then B will appear in A's friends list and A will appear in B's friends list, and similarly, any friendship removals update both the initiator and target player's friends list.

As described in greater detail below, along with the in-network friend graph, one embodiment of the invention also maintains another social graph built from user-submitted address books. Contact information in a player's address book may be uploaded and persisted as anonymized and name-spaced IDs. In one embodiment, to ensure privacy, a hashing operation is performed on one or more of the entries extracted from each user's address book such as email addresses or email handles. Consequently, when comparisons are made comparing the contacts in a user's address book (e.g., email addresses, handles, aliases, etc) to contacts of existing game center users, the comparison is made on the hashes of the respective contacts data as opposed to the actual textual data. By cross-referencing the friend, address book, and other social graphs, as described below, more recommendations can be created for players who already have in-network friends and also provide relevant recommendations to new players who have yet to friend others in the Game Center network.

In one embodiment, the friend recommendation system described herein has a two tiered architecture for creating recommendations and three back end systems for building and servicing the partitioned social graphs. The recommendation engine contains modules which have intelligence for traversing different types of social graphs and may also collect data from other sources if social recommendations are not available. A recommendation list is created at the request of a player via a client and these recommendations may be filtered if the size of the list exceeds some cap.

Figure 6:
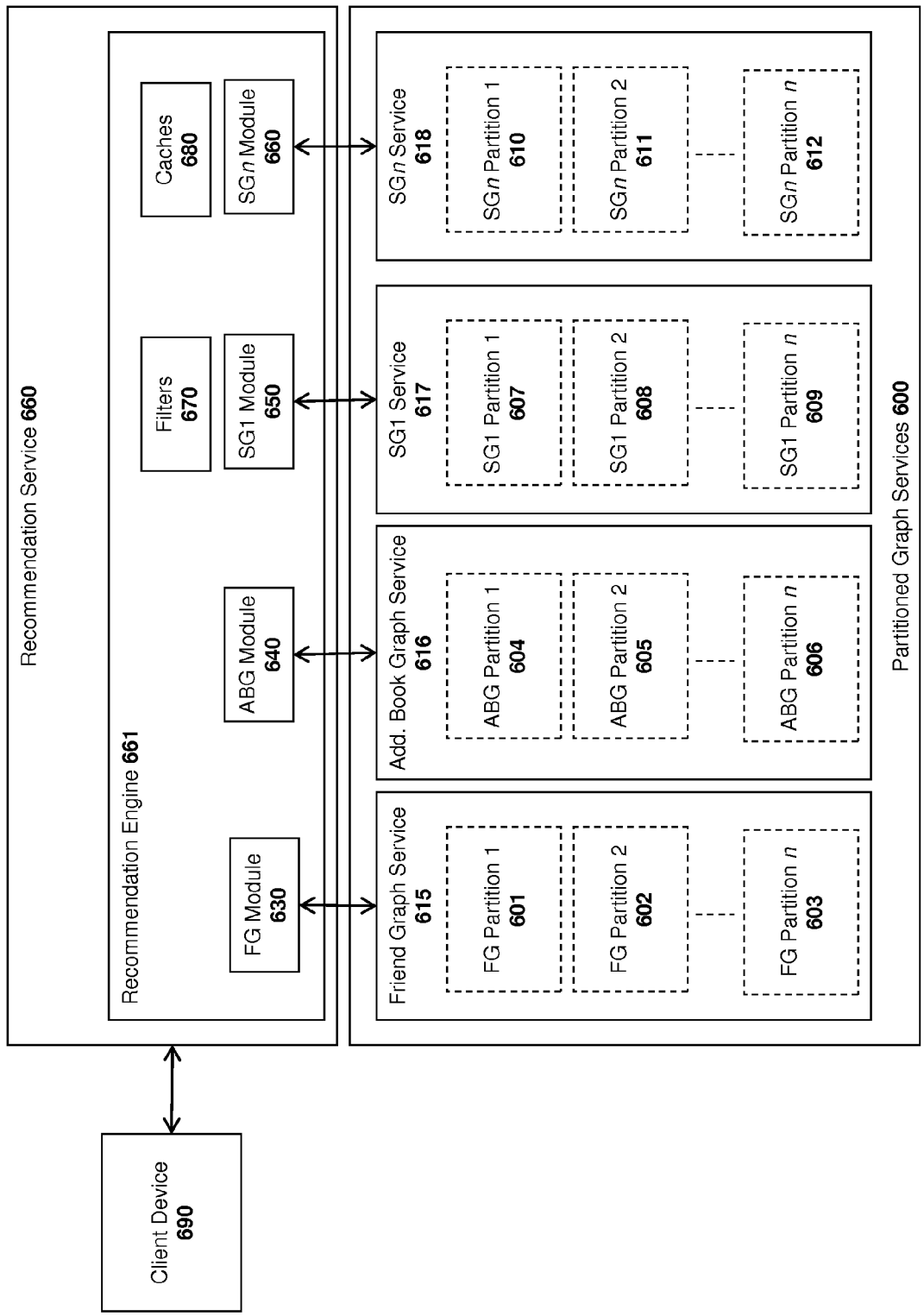
FIG. 6 illustrates a recommendation service and a plurality of partitioned graph services employed in one embodiment of the invention.

As illustrated generally in FIG. 6, the top tier of the recommendation system is the recommendation service 660 which houses the recommendation engine 661 and graph modules 630, 640, 650, 660 each of which understands one type of graph and how nodes in the graph relate to a primary network. In the particular example shown in FIG. 6, the recommendation engine 661 includes a friend graph module 630 for reading and writing a user's friend graph data from a friend graph service 610; an address book graph module 640 for reading the user's address book data from an address book service 611; and one or more additional social graph modules 650, 660 for reading social networking data from other internal or external (e.g., Facebook) social networking services. In one embodiment, after a request for recommendations is received from a client 690, the recommendation engine 661 queries each module for a subgraph of the target player's social graph, coalesces the different graphs, and builds recommendations by traversing the new merged graph. Social graphs queried by modules 617-618 may reside outside of the game center system but, in one embodiment, the address book graph and in-network social graphs described herein are managed internally.

As described in greater detail below, given the vast amount of data involved, the various graphs may be split up into a set of partitions 601-612 to be processed more efficiently and persisted. Additionally, as illustrated in FIG. 6, the recommendation engine 661 may include one or more filters 670 for filtering recommendations based on user-specified preferences and caches 680 for temporarily caching graph data as recommendations are made.

As used herein, the friend graph partitions 601-603 managed by the friend graph service 615 and the address book graph partitions 604-606 managed by the address book graph service 616 (sometimes referred to herein as FG and ABG, respectively), and edge relationships between the nodes in each of these graphs will be denoted herein as follows:
A–>B: outgoing edge from node A to node B, i.e., User A knows User B
A<–B: incoming edge from node B to node A, i.e., User B knows User A
A<–>B: incoming and outgoing edge from node A to node B In one embodiment, all nodes in the FG are of the same type—FG node—while the ABG has two different node types: ABG Player (ABGP) nodes and ABG Email Handle (ABGE) nodes. All node types have a node ID which is either a player ID or email handle, and for ABG nodes, the node IDs are name-spaced with the 'p:' and 'e:' prefixes to denote player IDs and email handles, respectively. For reasons described later, ABGP nodes can only have outgoing edges to ABGE neighbors and ABGE nodes only have incoming edges from ABGP neighbors. Note that other social graphs which may be used in accordance with the underlying principles of the invention may not necessarily impose the same node relationship policies.

A method implemented by one embodiment of the recommendation engine 661 for generating recommendations for new users is illustrated in FIG. 7. In one embodiment, after each new user joins the game center service, the user is prompted to share his/her address book which the recommendation engine will use to make new friend recommendations. Thus, at step 701, if the User A chooses to share his/her address book, the address book is uploaded (if User A's address book is stored locally on User A's computer system) and/or User A's online address book is accessed. As mentioned above, in one embodiment, a hashing operation is performed on one or more of the entries extracted from User A's address book to protect User A's privacy and comparisons are made to contacts of existing game center users using the hashed values of the respective contacts data as opposed to the actual textual data.

At 702, the graphs of current game center users are traversed to identify those other users who have User A's email address or an alias of User A listed. If User B, for example, has User A's email address in one of User B's graphs (e.g., User B's address book graph), then the recommendation engine 661 may identify User B as a good prospective recommendation for User A (and vice versa). Similarly, if an alias of User A is identified in User C's address book or friends list, then the recommendation may identify User C as a prospective recommendation for User A (and vice versa).

Similarly, at 703, the email addresses or aliases of current game center users are identified in User A's address book and used to make friend recommendations. For example, if User D is listed directly in User A's address book, then User D may be a good recommendation for User A (and vice versa).

At 704, the email addresses or aliases contained in User A's address book are compared against the email addresses or aliases in other users' address books. Those users who have email addresses common to user A may also represent good potential recommendations for User A. For example, if both User A and User E have User G's email address listed, then the recommendation engine may use this information to recommend User E to User A (and vice versa).

At 705, once all relevant graphs have been traversed, the recommendation engine 661 makes a set of recommendations to User A. In one embodiment, User A may accept, reject or ignore these recommendations. In one embodiment, the accepted recommendations are added to user A's game service friend graphs, rejected recommendations are tagged as such so that they will not be made again and ignored recommendations will be left unchanged.

Figure 8A:
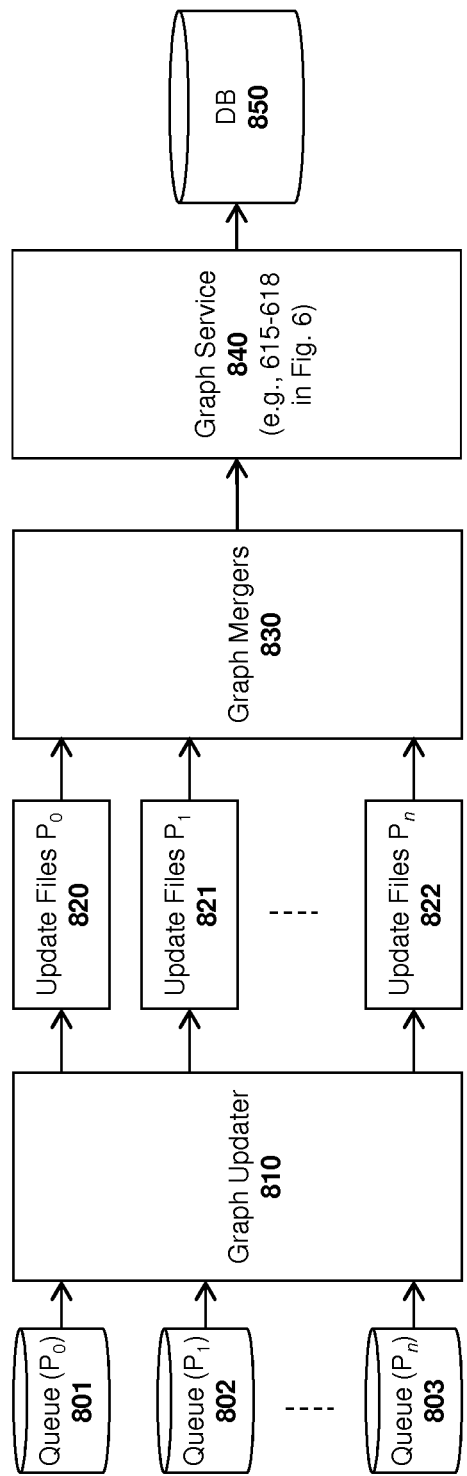
FIGS. 8a-b illustrate one embodiment of a system architecture for managing and updating friend graphs.

In one embodiment, updates to user A's friend and/or address book graphs (e.g., newly accepted friends and friend requests) will be implemented in accordance with the architecture illustrated in FIG. 8a. As previously mentioned with respect to FIG. 6, in one embodiment, the various different graphs may be split into partitions 601-612. The partitioned friend and address book graphs used to create the friend recommendations described herein are made available for in-memory lookups and will be generated in such a way that guarantees eventual consistency across partitions. For example, if node A's adjacency list contains node B, node B will eventually have node A in it's adjacency list even if A and B's list reside in different partitions. The system architecture illustrated in FIG. 8a is failure resilient, allows add and remove operations for edges in the graph, and supports repartitioning. In one embodiment, the three sub-systems illustrated in FIG. 8, the graph updater 810, graph merger 830, and graph service 840 operate independently of one another and failures in one module do not introduce data inconsistencies or corruption.

In one embodiment, each graph has a corresponding graph updater 810 which has intelligence for determining what partitions to update for a given edge relationship record. Graph updates happen by first creating a new edge relationship record, A<+>B, which is put onto a partitioned queue 801-803, and after being processed by the graph updater 810, the corresponding partitioned graph will be updated with the new edge. Edge removals are also permitted and are denoted by A</>B.

In one embodiment, the graph updater 810 fetches edge records from the various queues 801-803 at some time interval (e.g., every 15 minutes), processes them in order, and then creates a temporary update file 820-822 for each graph partition. After an update file is successfully written to storage, it is then moved to a known location for the graph merger 830 to consume and all processed edge records are consumed from the queue. Given the size of the data involved, keeping all the partitioned graphs in memory may not be feasible so update files 820-822 are created as an intermediate step. The update files 820-822 have embedded data which indicates graph partition affinity, the update partition which created the update file, and includes a incrementing version number (e.g., a timestamp) for each update partition which is used by the merger 830 to determine if the update file has already been merged. The merger 830 provides its merged results to each respective graph service 840 (e.g., 615-618 in FIG. 6) which updates its respective graph database as appropriate 850.

In one embodiment, the graph data is deleted from the various queues only after the update files have been successfully written. Update files are deleted only after the updates have been successfully committed to the database 850, thereby ensuring that data will not be lost in the event of a system failure.

Figure 8B:
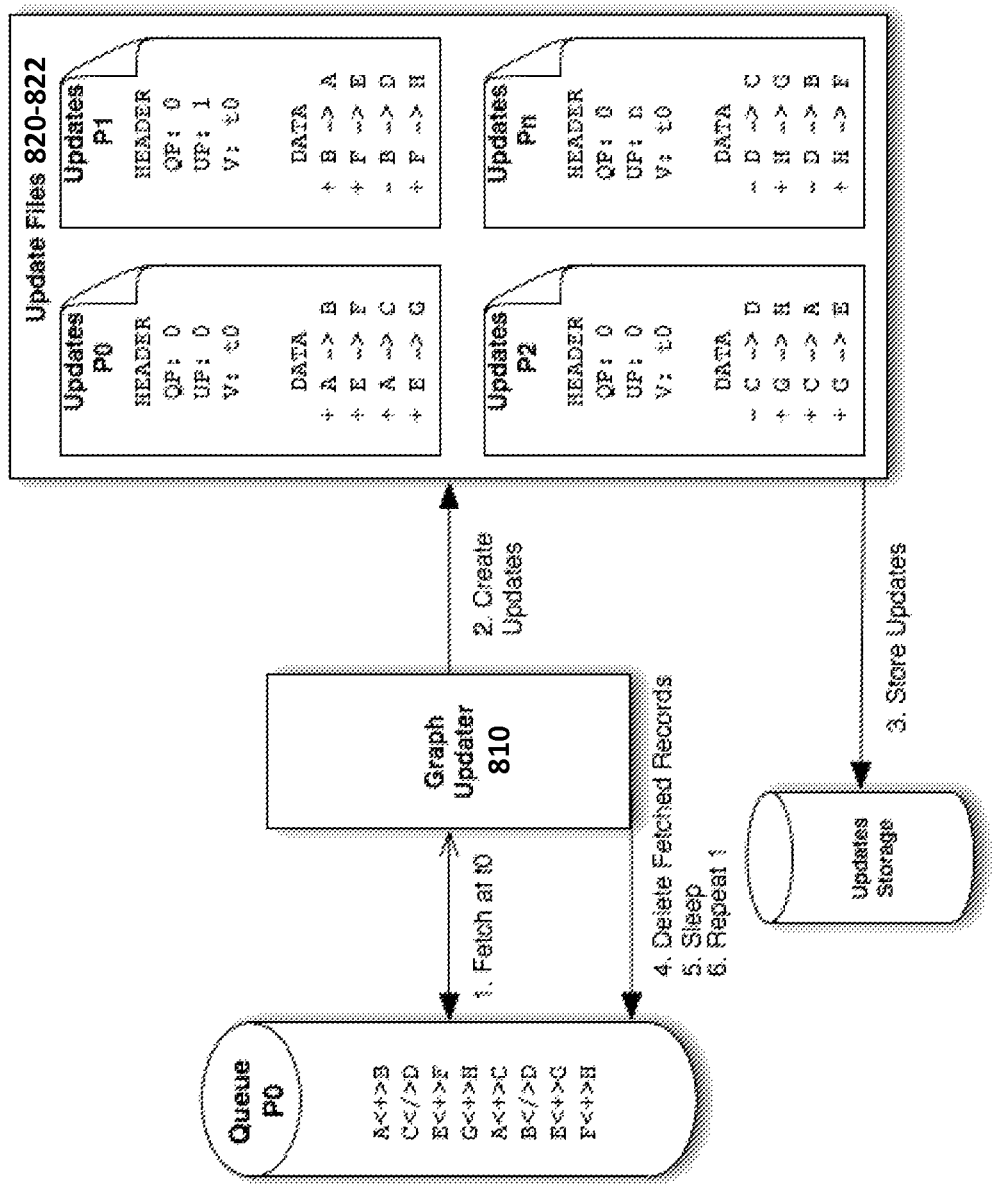

A specific example is illustrated in FIG. 8b for updates to a particular partition's queue (P0). At time $t_0$ (step 1) the updates are fetched by the graph updater 810. The relevant update files 820-822 for each partition (P0-Pn) are generated (step 2) to reflect the new changes. In the specific example shown in FIG. 8b, Users A and B are new friends. As such, User A's graph is updated to reflect the new relationship in the file for partition P0 and user B's graph is updated in the file for partition P1. The friend relationship between Users C and D has been broken (i.e., either User C has de-friended User D or vice versa). As such, User C's graph is updated in the file for P2 and User D's graph is updated to reflect the change in the file for partition Pn. Various additional examples are provided in FIG. 8b. Finally, at step 3, after the updates have been successfully committed to storage, the partition files and queue data is deleted.

Depending on the particular graph, a graph updater may process new edge records in a nonconventional way. For example, in the address book graph, the adjacency list for a given node may contain neighbors with incoming and/or outgoing edges so it is possible to determine which other nodes in the graph reference the node even if there are no outgoing edges. This means the new edge relationship record A->B may update A's adjacency list with an outgoing edge to B and B's adjacency list with an incoming edge from A. Similarly, a new edge relationship A<->B updates A's list with an incoming and outgoing edge to B and B's list with an incoming and outgoing edge to A. Storing edges two-way allows instant social-graph recommendations to be generated and related back to the primary network.

Figure 9:
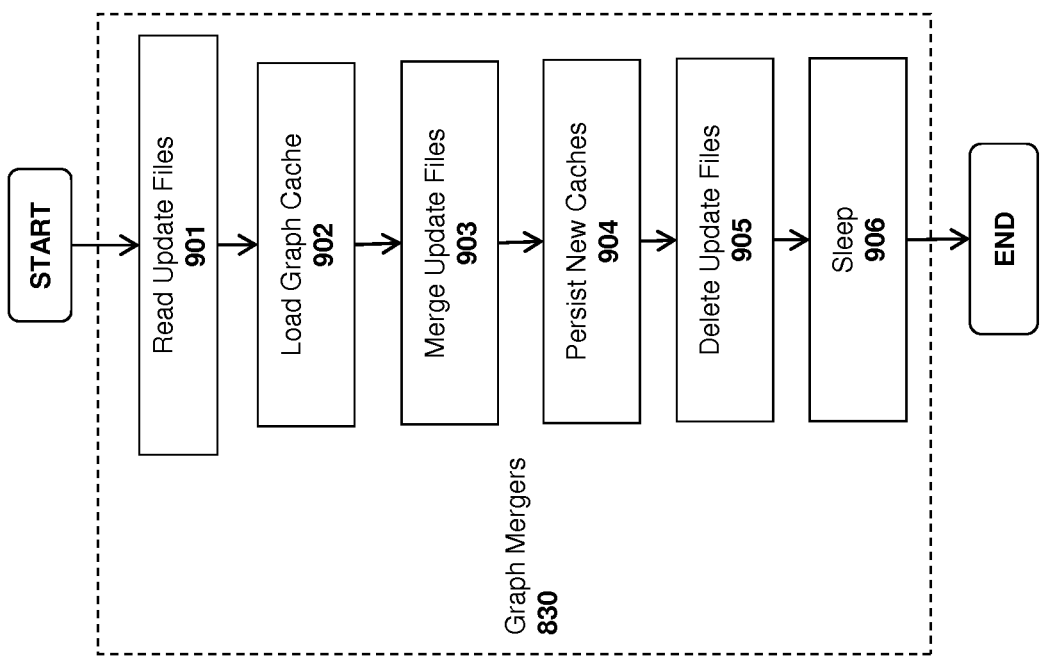
FIG. 9 illustrates one embodiment of a computer-implemented method for merging graph updates.

As previously mentioned, in one embodiment, the graph mergers 830 consume the update files 820-822 created by graph updaters and each merger operates on one partition of the graph. FIG. 9 illustrates a method implemented by one embodiment of a graph merger. At a given time interval, a merger wakes up, reads all update files available to process for its graph partition at 901, loads the current cache for its partition at 902, and then merges the updates from the collected update files into the cache at 903. Before merging an update file, the merger first checks that the version of the update file is greater than the corresponding version in its current graph cache. A graph cache contains a version for each update partition since data in each partition is processed independently. After a merger successfully merges all update files, the updated graph cache is persisted to storage at 904 as a temporary file and upon completion of the write, this file is moved to a location known by the graph service. After the file is moved, all processed update files are deleted from storage at 905 and eventually a graph service will pick up the newly created graph cache. At 906, the process sleeps until the beginning of the next designated time interval.

As mentioned above, in one embodiment, the partitioned graph caches generated by graph mergers 830 are ingested by a clustered graph service 840 which responds to queries related to each respective graph. The graph caches are periodically refreshed from storage for freshness and all operations on the cache are read-only. The most common query for a graph service to execute is fetching the neighbor information for a given node ID. For example, the recommendation service 660 described herein may build a rooted subgraph from the in-network friends graph by first querying the neighbors for a player ID and then querying the neighbors for the returned set to obtain the 2nd order neighbors. Clients of the graph service know the graph partition affinity for a given ID and thus only query the graph service which owns that particular partition.

In one embodiment, friend recommendations generated by the recommendation engine 661 are built from two social graphs: the friend and address book graphs. As discussed above, the former is a graph of friendships created within the game center network while the latter is a graph generated from user-provided address books. By simply associating a player profile with identities in other social graphs, a player has immediate access to relevant recommendations.

Figure 10:
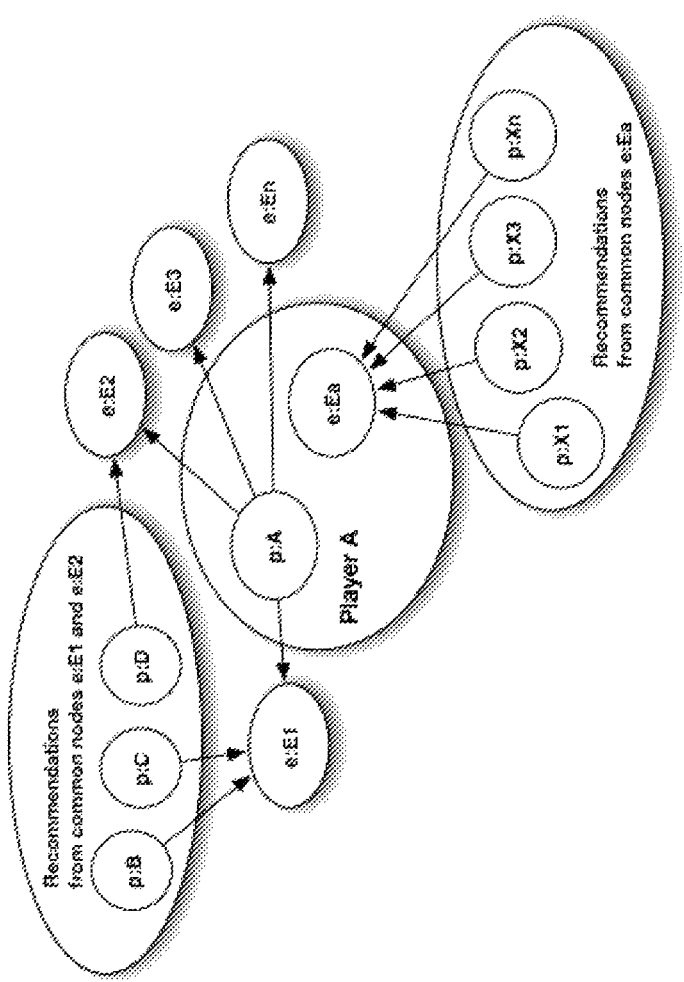
FIG. 10 illustrates a specific example of generating recommendations in accordance with one embodiment of the invention.

One specific example of a working embodiment of the invention will now be described with respect to FIG. 10. It should be noted, however, that the underlying principles of the invention are not limited to this specific implementation. For a new player A with email address Ea, A will have instant recommendations if there have been previous users who have uploaded an address book which contains Ea. Internally, these relationships are represented as PlayerID {X1}->Ea, PlayerID {X2}->Ea, ... PlayerID {Xn}->Ea and edge relationships are stored in both the ABGP and ABGE nodes. In the previous example, p:X1... Xn's neighbor list will have ABGE node Ea as a neighbor with an outgoing edge and e:Ea's neighbor list will have ABGP nodes p:X 1... p:Xn as neighbors with incoming edges. By looking up the neighbor list for e:Ea, we'll see incoming edges for ABGP nodes p:X1... p:Xn which are instant recommendations for player A.

Additionally, as previously described, one embodiment of the recommendation engine uses the address book graph to recommend players in the network who also have common emails in their address book. By way of example, and not limitation, if p:B and p:C have e:E1 in their address book and p:A has e:E1 in their address book, the recommendation engine 661 may recommend p:B and p:C to p:A and p:A to p:B and p:C. This type of recommendation can be done without e:E1 being registered in-network and if at any point e:E1 registers, that new player will be recommended p:A, p:B, and p:C. For any ABG recommendation, the recommendation engine 661 may also cross-reference the friend or other social graphs and create recommendations based on the ABG recommendation's in-network neighbors. In the previous example, this means the recommendation engine 661 would also recommend p:A, p:B, p:C's friend graph neighbors to the new player registered with e:E1.

System and Method for Asynchronous Matchmaking within an Asynchronous Game Service One embodiment of the invention allows users to participate in turn-based games within the context of the matchmaking, game service, and friend service architectures already described. For example, a user may choose to initiate a turn-based game using the friend recommendations generated by the recommendation service and/or matches generated by the matchmaker service described above. It should be noted that certain details of these other services (e.g., the game center service, CDX service 410, registration/director service 452, and friend service 100) may not be described below to avoid obscuring the underlying principles of the invention. Those of ordinary skill in the art will readily understand how these services may be employed within the overarching context of the present invention.

Figure 11:
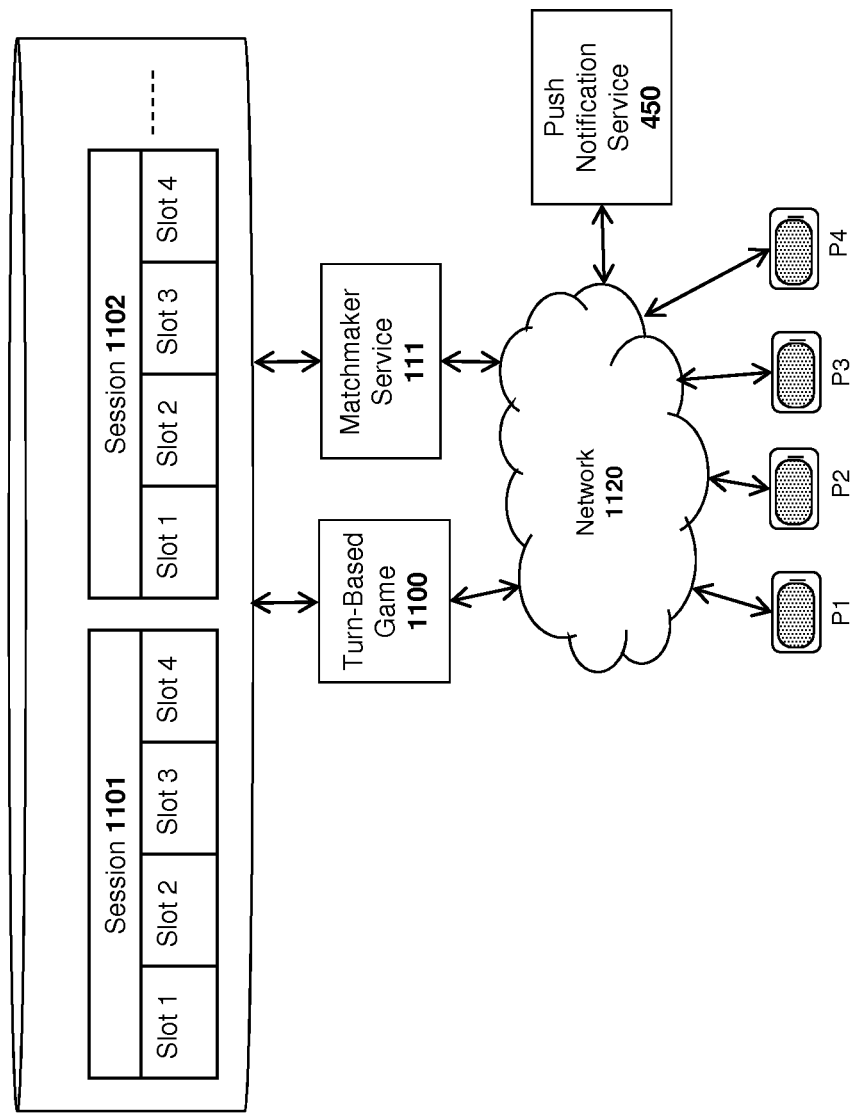
FIG. 11 illustrates one embodiment of an architecture for implementing turn-based games.

Turning now to FIG. 11, a turn-based game service 1101 is illustrated for implementing turn-based games for a plurality of players (P1-P4) in combination with the matchmaker service 111 and, in one embodiment, a push notification service 450. All of the entities illustrated in FIG. 11 communicate over a network 1120 which, for the purpose of the present invention, may be any form of data network including public networks (e.g., the Internet) and private networks (e.g., private wireless, wired LANs) or any combinations thereof (e.g., having both public links and private links).

In one embodiment of the invention, the turn-based game service 1100 implements a scheme to locate players for turn-based game sessions 1101, 1102. One goal of this embodiment is to allow a user to start playing a multi-player turn based game as soon as possible and allow invited friends or suitable anonymous players to join the game and take turns as needed.

Two game "sessions" 1101-1102, each having four "slots" (identified as Slots 1-4) are illustrated in FIG. 11. In one embodiment, when a player completes a turn, a request is made to the turn-based game service 1100 to move the turn to the next slot in the game session. If there is an active player in the slot, then the turn-based game service 1100 may send a notification to that player (e.g., via the push notification service 450). In one embodiment, the operating system of the current player's mobile device provides a mechanism for the current turn player to run the game application and play their turn. When the turn is completed, a request is made to move the turn to the next game-determined slot by the turn-based game service 1100.

If, however, there is no player assigned to the slot, then in one embodiment, the session is inserted into a pool of sessions waiting to be matched by the matchmaker service 111 (using the matching techniques described above). In one embodiment, a player makes a request to start a game session and provides the identity of zero or more friends he would like to join the game, and specifies the minimum and maximum number of slots in the game session. The matchmaker service 111 looks for any existing sessions in the match pool and selects the "best" match based on, for example, the number of available slots, the language of the players, the leader board position of each of the players, game version compatibility, and other criteria. The foregoing are merely illustrative examples of matching criteria and are not meant to limit the scope of the present invention. If there is a match, the requesting player is placed into the slot with the turn, and invited friends are placed into other open slots. The requesting player will then be able to take a turn. If there is no suitable match, a new session may be started with the requesting player and friends placed into the empty slots.

Figure 12:
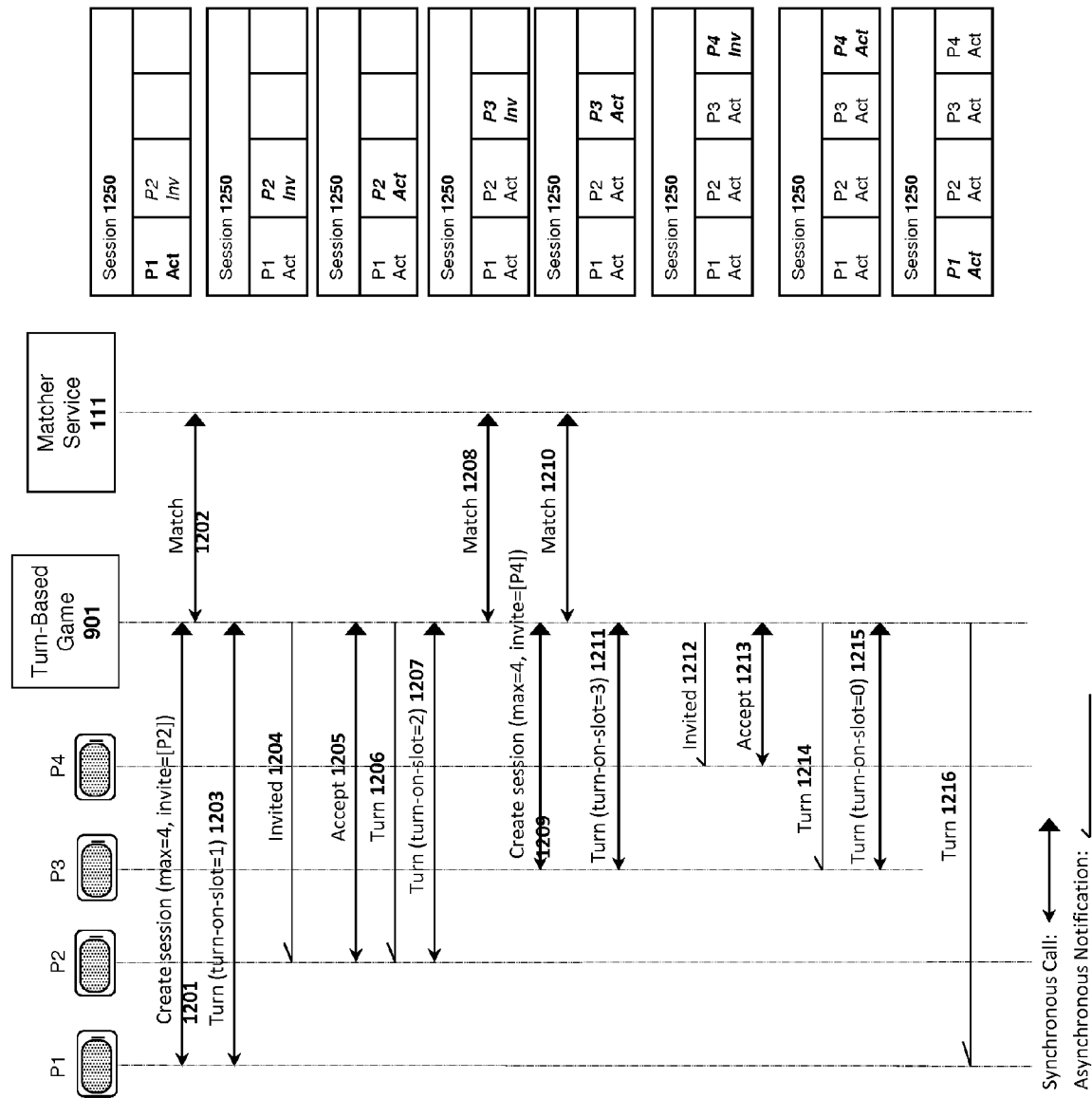
FIG. 12 illustrates a set of transactions for implementing turn-based games in accordance with one embodiment of the invention.

FIG. 12 illustrates one particular example in which protocol messages are exchanged between the turn-based game service 901, a group of player devices P1-P4, and a matchmaker service 111. Note that the transaction diagram uses different graphic representations to identify synchronous calls (e.g., 1201) and asynchronous notifications (e.g., 1204).

At 1201 player P1 creates a new session with P1 s friend P2 as an invited player (e.g., identifying P2 using P2's email address). At 1202, the turn-based game service 901 initially determines whether there is an existing session into which P1 and friend, P2, can be placed. If not, then a new session is created with the turn on P1 in slot 0 and P2 in slot 1. P1 takes a turn moving the turn to slot 1. The occupant of slot 1 is P2 in the Invited state and is sent an Invited message 1204. In one embodiment, the invited message 1204 is an asynchronous notification transmitted to P2 via the push notification service as described above.

At 1205, P2 accepts the invitation and, consequently, P2's state is changed to 'Active' within the session and a notification sent back to P2 that it is P2's turn at 1206. Once again, this may be performed using an asynchronous notification message transmitted to P2 via the push notification service. P2 takes a turn at 1207 moving the turn to slot 2 which is empty. Consequently, the turn-based game 901 places the session into a pool of sessions at 1208 (e.g., using the same bundleId, bucketId and partitionId as described in the prior matchmaker applications).

Player P3 requests a session with P3 s friend P4 at 1209. The turn-based game service 901 finds there is an existing session into which these players are placed and the reference to this session is returned by the matcher service 111 at 1210. Player P3 takes a turn at 1211 and in a similar manner to described above an asynchronous invited notification is sent to P4 at 1212. Player P4 accepts the invitation at 1213, takes their turn at 1214 and moves the turn back to slot 0 and player P1 at 1215. The game continues at 1216 with each player receiving a turn notification and moving the turn to the next slot until completion.

Different API Embodiments

The API implemented in one embodiment, is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 13:
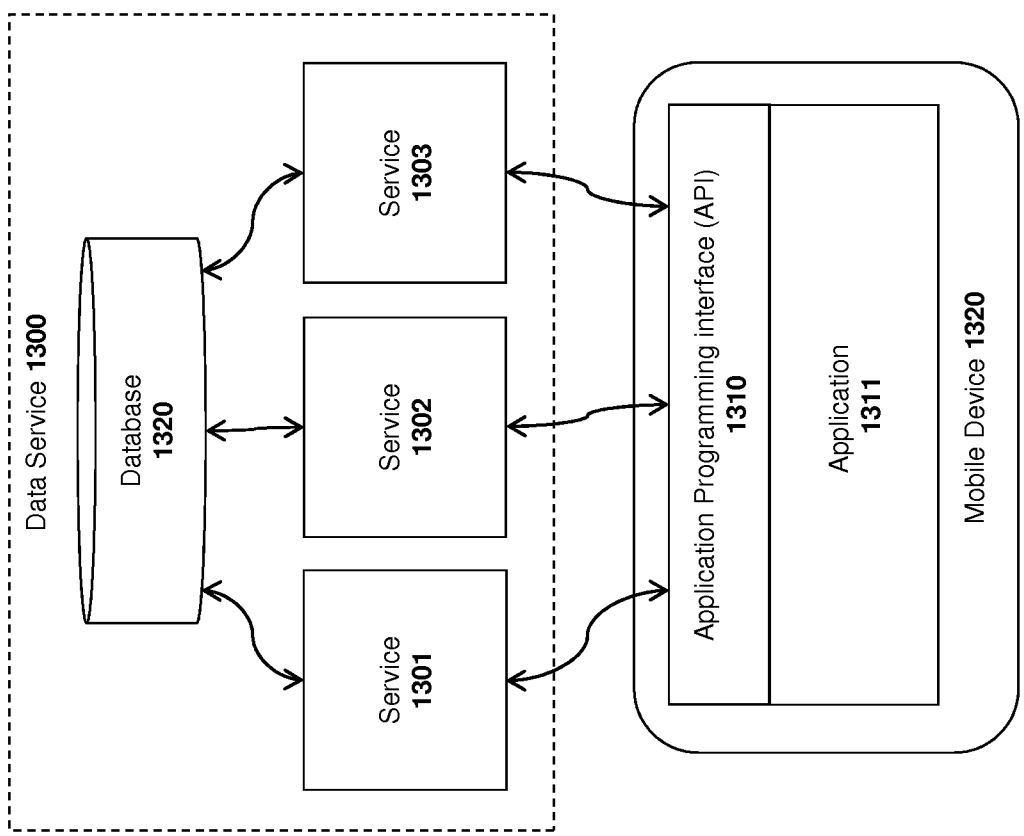
FIG. 13 illustrates a framework exposing an application programming interface (API) for applications and a service API for communicating with a set of services.

As illustrated in FIG. 13, one embodiment of the invention is implemented within the context of a mobile device 1320 having a predefined software framework with an application programming interface ("API") 1310 for interfacing with one or more applications 1311 and a service-side API 1310 for communicating with a plurality of network services 1301-1303. As shown in FIG. 13, the network services 1301-1303 may be designed and/or managed by the same online data service 100 (although such a configuration is not required). Applications 1311 such as P2P gaming applications and other types of collaborative online applications may be designed to access the network services 1301-1303 through the API 1310 by making calls to the API 1310. The design of applications 1311 may be facilitated using a software development kid ("SDK") provided by the developer of the framework 1312 and the network services 1301-1303.

As illustrated, each of the services may be provided with access to a database 1320 for storing data used by the services. One particular example is the database 1512 used by the matchmaker service 111 (described above). Other examples may include a leaderboard database for storing leaderboard data, a friend service database for storing friend state records, a profile database for storing user profile data and a games database for storing data related to online games. Any type of database may be used (e.g., MySQL, Microsoft SQL, etc) but in one particular embodiment, a key/value database such as Berkley DB and/or MZBasic DB can be used. The databases may be spread across a large number mass storage devices (e.g., hard drives) in a Storage Area Network (SAN) or other storage configuration.

Consequently, when a particular service processes and/or stores data as described above, the data may be stored within the database 1320. Some services, however, may not utilize a database. For example, as described above, the invitation service 112 may be implemented as a stateless service and, therefore, may not be required to store data within a database 1320 (although such an implementation is still possible in accordance with the underlying principles of the invention).

The API 1313 may be designed to communicate and exchange information with the network services 1301-1303 using any suitable network protocol stack including, for example, TCP/IP or UDP/IP at the network layer and HTTPS at the application layer. An remote procedure call (RPC)-based protocol over HTTP or HTTPS such as SOAP may be used and/or a Representational State Transfer (REST) protocol may be used. Moreover, the services may be implemented on any computing platform including, by way of example, Xserve or similar servers running Unix, Linux or an Apache software platform. In one particular embodiment, the platform includes Web objects implemented on Linux. The foregoing examples are provided merely for the purpose of illustration. The underlying principles of the invention are not limited to any particular mechanism for linking applications to services or any particular set of network protocols.

Figure 14:
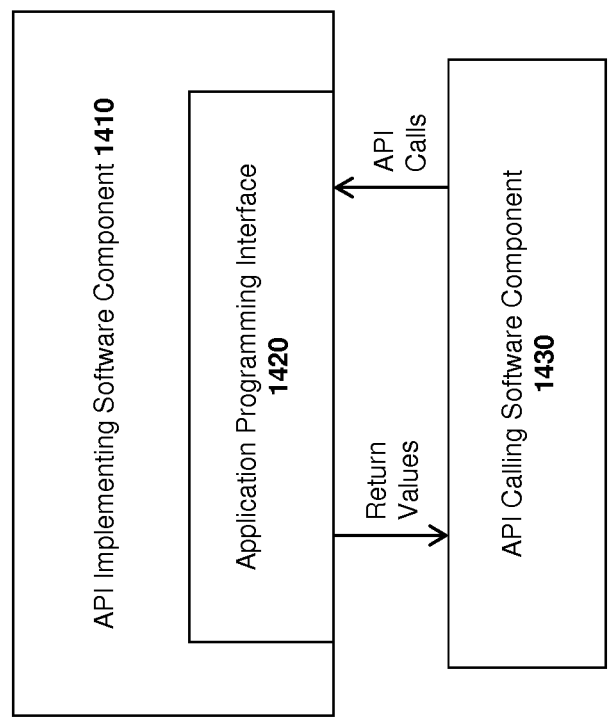
FIG. 14 one embodiment of an API implementing software component and an API calling software component.

FIG. 14 illustrates one embodiment of an API architecture which includes an API implementing software component 1410 (e.g., an operating system, a library, a device driver, an API, an application program, or other software module) that implements the API 1420. The API 1420 specifies one or more functions, methods, classes, objects, protocols, data structures, formats and/or other features of the API implementing software component that may be used by the API calling software component 1430. The API 1420 can specify at least one calling convention that specifies how a function in the API implementing software component receives parameters from the API calling software component and how the function returns a result to the API calling software component. The API calling software component 1430 (e.g., an operating system, a library, a device driver, an API, an application program, or other software module), makes API calls through the API 1420 to access and use the features of the API implementing software component 1410 that are specified by the API 1420. The API implementing software component 1410 may return a value through the API 1420 to the API calling software component 1430 in response to an API call.

It will be appreciated that the API implementing software component 1410 may include additional functions, methods, classes, data structures, and/or other features that are not specified through the API 1420 and are not available to the API calling software component 1430. It should be understood that the API calling software component 1430 may be on the same system as the API implementing software component 1410 or may be located remotely and accesses the API implementing software component 1410 using the API 1420 over a network. While FIG. 14 illustrates a single API calling software component 1430 interacting with the API 1420, it should be understood that other API calling software components, which may be written in different languages (or the same language) than the API calling software component 1430, may use the API 1420.

The API implementing software component 1410, the API 1420, and the API calling software component 1430 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 15:
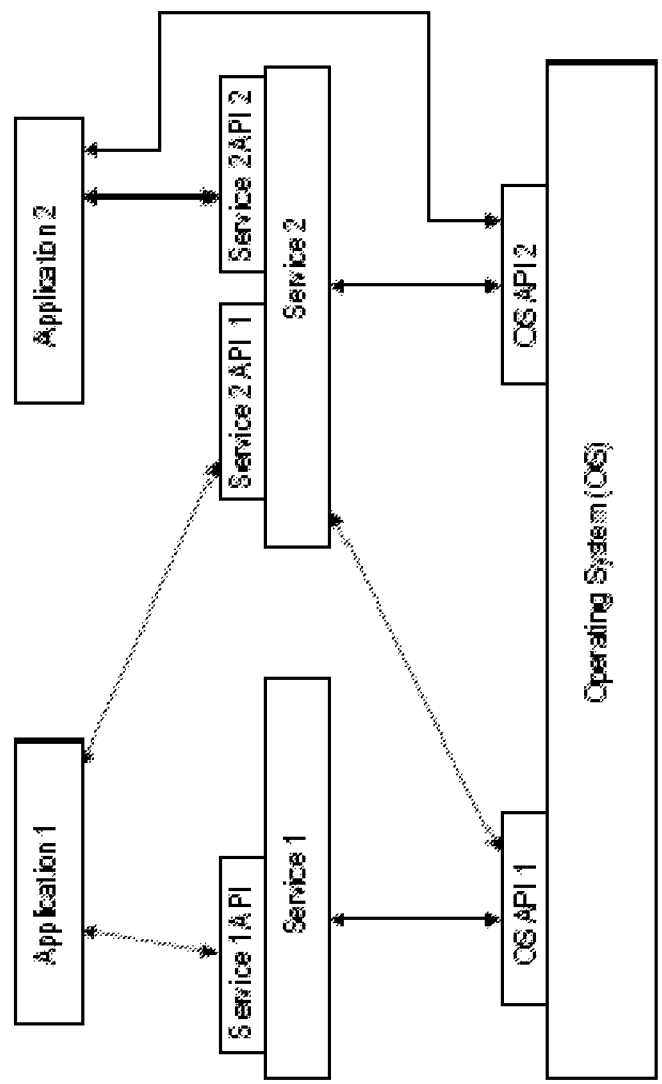
FIG. 15 illustrates one embodiment in which API calls are made between operating systems, services, and applications.

In FIG. 15 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 16:
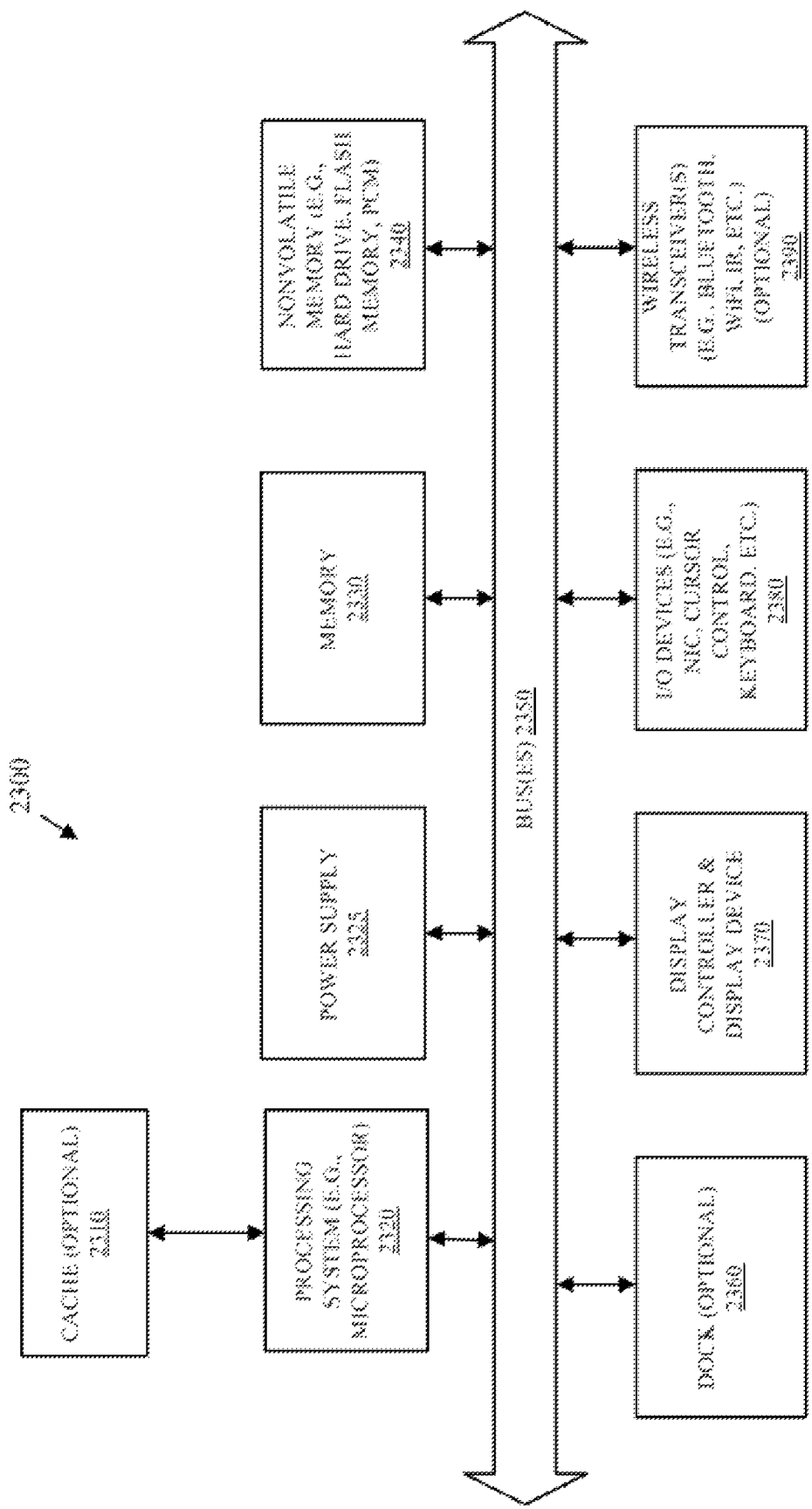
FIG. 16 illustrates one embodiment of an exemplary computer system architecture.

FIG. 16 is a block diagram illustrating an exemplary computer system which may be used in some embodiments of the invention. It should be understood that while FIG. 16 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 16, the computer system 2300, which is a form of a data processing system, includes the bus(es) 2350 which is coupled with the processing system 2320, power supply 2325, memory 2330, and the nonvolatile memory 2340 (e.g., a hard drive, flash memory, Phase-Change Memory (PCM), etc.). The bus(es) 2350 may be connected to each other through various bridges, controllers, and/or adapters as is well known in the art. The processing system 2320 may retrieve instruction(s) from the memory 2330 and/or the nonvolatile memory 2340, and execute the instructions to perform operations as described above. The bus 2350 interconnects the above components together and also interconnects those components to the optional dock 2360, the display controller & display device 2370, Input/Output devices 2380 (e.g., NIC (Network Interface Card), a cursor control (e.g., mouse, touchscreen, touchpad, etc.), a keyboard, etc.), and the optional wireless transceiver(s) 2390 (e.g., Bluetooth, WiFi, Infrared, etc.).

Figure 17:
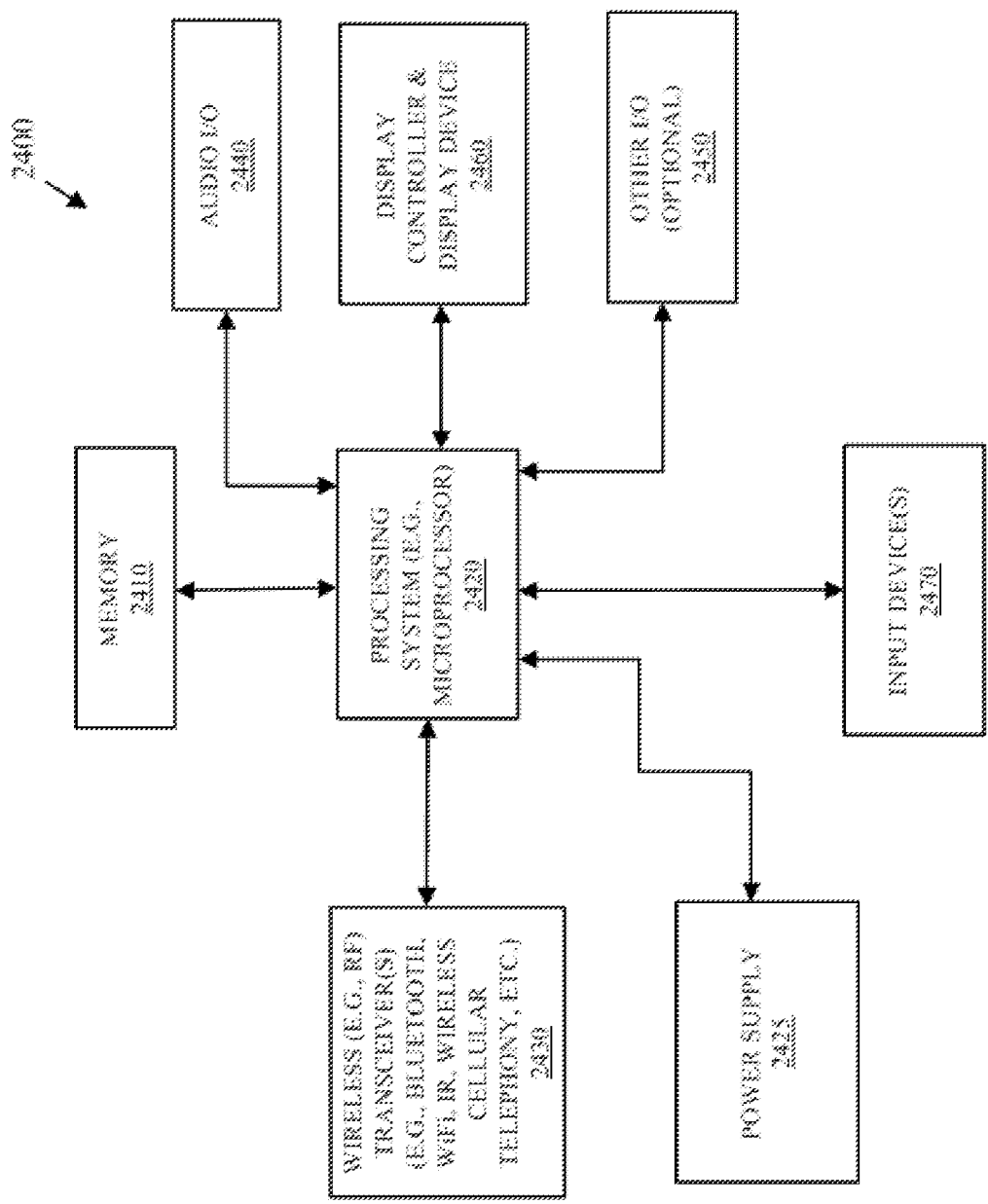
FIG. 17 illustrates another embodiment of an exemplary computer system architecture.

FIG. 17 is a block diagram illustrating an exemplary data processing system which may be used in some embodiments of the invention. For example, the data processing system 2400 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 2400 may be a network computer or an embedded processing device within another device.

According to one embodiment of the invention, the exemplary architecture of the data processing system 2400 may used for the mobile devices described above. The data processing system 2400 includes the processing system 2420, which may include one or more microprocessors and/or a system on an integrated circuit. The processing system 2420 is coupled with a memory 2410, a power supply 2425 (which includes one or more batteries) an audio input/output 2440, a display controller and display device 2460, optional input/output 2450, input device(s) 2470, and wireless transceiver(s) 2430. It will be appreciated that additional components, not shown in FIG. 24, may also be a part of the data processing system 2400 in certain embodiments of the invention, and in certain embodiments of the invention fewer components than shown in FIG. 17 may be used. In addition, it will be appreciated that one or more buses, not shown in FIG. 17, may be used to interconnect the various components as is well known in the art.

The memory 2410 may store data and/or programs for execution by the data processing system 2400. The audio input/output 2440 may include a microphone and/or a speaker to, for example, play music and/or provide telephony functionality through the speaker and microphone. The display controller and display device 2460 may include a graphical user interface (GUI). The wireless (e.g., RF) transceivers 2430 (e.g., a WiFi transceiver, an infrared transceiver, a Bluetooth transceiver, a wireless cellular telephony transceiver, etc.) may be used to communicate with other data processing systems. The one or more input devices 2470 allow a user to provide input to the system. These input devices may be a keypad, keyboard, touch panel, multi touch panel, etc. The optional other input/output 2450 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method, performed by a computing device, for asynchronous matchmaking for an online, turn-based game comprising:

initiating, by the computing device, a turn-based game having a plurality of player slots in response to a request from a first user;

assigning the first user to a first slot in the plurality of slots;

allowing the first user to take a turn in the turn-based game in the first slot before all of the other plurality of slots have been assigned to other users;

matching the first user with a second user for the turn-based game based on a specified set of matching criteria, wherein the specified set of matching criteria comprises a skill level of the first user, and wherein other users are matched who are at approximately the same skill level;

assigning the second user to a second slot in the plurality of slots; and allowing the second user to take a turn in the turn-based game in the second slot.

2. The method as in claim 1 wherein the request from the first user identifies one or more other users with whom the first user wishes to play the turn-based game, the method further comprising:

determining the online status of the one or more other users and, for those other users which are online, inviting the other users to participate in the turn-based game.

3. The method as in claim 2 further comprising:

receiving a positive response from a third user of the one or more other users invited to participate in the turn-based game indicating that the third user has accepted the invitation to participate in the turn-based game.

4. The method as in claim 3 further comprising:

assigning the third user to a third slot in the turn-based game; and allowing the third user to take a turn in the turn-based game in the third slot.

5. The method as in claim 1 wherein the specified set of matching criteria comprises a language spoken by the first user, wherein other users are matched who speak the same language.

6. The method as in claim 1 wherein the specified set of matching criteria comprises a friend relationship between the first user and other users, wherein users who are friends of the first user are matched to play the game.

7. A non-transitory computer machine-readable medium having program code stored thereon which, when executed by a processing system causes the processing system to perform, a method, the method comprising:

initiating a turn-based game having a plurality of player slots in response to a request from a first user;

assigning the first user to a first slot in the plurality of slots;

allowing the first user to take a turn in the turn-based game in the first slot before all of the other plurality of slots have been assigned to other users;

matching the first user with a second user for the turn-based game based on a specified set of matching criteria, wherein the specified set of matching criteria comprises a skill level of the first user, and wherein other users are matched who are at approximately the same skill level;

assigning the second user to a second slot in the plurality of slots; and allowing the second user to take a turn in the turn-based game in the second slot.

8. The non-transitory machine-readable medium as in claim 7 wherein the specified set of matching criteria comprises a language spoken by the first user, wherein other users are matched who speak the same language.

9. The non-transitory machine-readable medium as in claim 7 wherein the specified set of matching criteria comprises a friend relationship between the first user and other users, wherein users who are friends of the first user are matched to play the game.

10. The non-transitory machine-readable medium as in claim 7 wherein the request from the first user identifies one or more other users with whom the first user wishes to play the turn-based game, the machine-readable medium comprising additional program code to cause the machines to perform the additional operations of:

determining the online status of the one or more other users and, for those other users which are online, inviting the other users to participate in the turn-based game.

11. The non-transitory machine-readable medium as in claim 10 comprising additional program code to cause the machines to perform the additional operations of:

receiving a positive response from a third user of the one or more other users invited to participate in the turn-based game indicating that the third user has accepted the invitation to participate in the turn-based game.

12. The non-transitory machine-readable medium as in claim 11 additional program code to cause the machines to perform the additional operations of:

assigning the third user to a third slot in the turn-based game; and allowing the third user to take a turn in the turn-based game in the third slot.

13. A system comprising a memory for storing program code and a processor for processing the program code to perform the operations of:

initiating a turn-based game having a plurality of player slots in response to a request from a first user;

assigning the first user to a first slot in the plurality of slots;

allowing the first user to take a turn in the turn-based game in the first slot before all of the other plurality of slots have been assigned to other users;

matching the first user with a second user for the turn-based game based on a specified set of matching criteria, wherein the specified set of matching criteria comprises a skill level of the first user, and wherein other users are matched who are at approximately the same skill level;

assigning the second user to a second slot in the plurality of slots; and allowing the second user to take a turn in the turn-based game in the second slot.

14. The system as in claim 13 wherein the request from the first user identifies one or more other users with whom the first user wishes to play the turn-based game, the system comprising additional program code to cause the processor to perform the additional operations of:

determining the online status of the one or more other users and, for those other users which are online, inviting the other users to participate in the turn-based game.

15. The system as in claim 14 comprising additional program code to cause the processor to perform the additional operations of:

receiving a positive response from a third user of the one or more other users invited to participate in the turn-based game indicating that the third user has accepted the invitation to participate in the turn-based game.

16. The system as in claim 15 comprising additional program code to cause the processor to perform the additional operations of:

assigning the third user to a third slot in the turn-based game; and allowing the third user to take a turn in the turn-based game in the third slot.

17. The system as in claim 13 wherein the specified set of matching criteria comprises a language spoken by the first user, wherein other users are matched who speak the same language.

18. The system as in claim 13 wherein the specified set of matching criteria comprises a friend relationship between the first user and other users, wherein users who are friends of the first user are matched to play the game.

* * * * *